United States Patent Office 3,351,657
Patented Nov. 7, 1967

3,351,657
PRODUCTION OF OXYGEN-CONTAINING ORGANIC COMPOUNDS BY THE CO-OXIDATION OF CYCLOPARAFFINS AND ALDEHYDES
Leonard Andrew Duncanson and Herbert George Lawley, Norton-on-Tees, England, assignors to Imperial Chemical Industries Limited, London, England, a corporation of England
No Drawing. Filed Feb. 18, 1963, Ser. No. 259,410
Claims priority, application Great Britain, Feb. 23, 1962, 7,155/62
9 Claims. (Cl. 260—530)

This invention relates to the production of oxygen-containing organic compounds, notably alcohols, ketones and carboxylic acids.

According to the present invention, there is provided a process for the production of oxygen-containing organic compounds, particularly carboxylic acids and alcohols and/or ketones, which comprises the step of contacting a liquid mixture containing an aldehyde having from two to four carbon atoms and a paraffin and/or a cycloparaffin and/or a substituted derivative thereof at a temperature in the range of 30° C. to 200° C. with a gas containing molecular oxygen.

Paraffins which are suitable for use may contain from three to fifteen carbon atoms or more in the molecule. They may be straight or branched chain in nature, the presence of a straight chain in general favouring the production of compounds having the same number of carbon atoms as the original paraffin. The co-oxidation of a straight-chain paraffin and an aldehyde gives rise to a product comprising neutral materials consisting essentially of alcohols and ketones containing the same number of carbon atoms and the same carbon skeleton as the starting material, and acidic products consisting essentially of carboxylic acids. If, for instance, n-octane is co-oxidised with n-butyraldehyde, the product comprises octanones, octanols and n-butyric acid, together with smaller amounts of diketones, acetic acid and propionic acid.

Cycloparaffins, notably cyclopentane and cyclohexane, may be co-oxidised with aldehydes in the present process. Thus the co-oxidation of cyclohexane and acetaldehyde gives a product comprising cyclohexanone, cyclohexanol, adipic acid and acetic acid, together with by-products including cyclohexyl esters and other oxygen-containing compounds. The cycloparaffins employed in the present process may contain alkyl substituents. Thus, methylcyclohexane may be co-oxidised to a product containing 2-, 3- and 4 - methyl - cyclohexanones and 1-, 2-, 3- and 4 - methyl - cyclohexanols. The product contains only trace amounts of cyclohexanone and cyclohexanol, showing that the methyl group is substantially resistant to oxidation and that oxidative degradation of the cycloparaffin has occurred only to a very limited extent.

The starting materials employed in the present process may be compounds of the type described in the two preceding paragraphs which also incorporate substituent groups such as acyl, acyloxy, carboxyl, alkoxy, aryl and halide groups.

Aldehydes employed as co-oxidants in the present invention may contain from two to four carbon atoms and may be saturated or unsaturated. Acetaldehyde is particularly important. When the aldehyde employed in the reaction is volatile at the temperature at which it is intended to operate, the use of elevated pressures may be preferable. Also, when a highly volatile aldehyde such as acetaldehyde is used, the use of a diluent may be desirable, particularly when the reaction is to be carried out at atmospheric or slightly higher pressures and when a metal salt is to be used as initiator. Saturated aldehydes containing three or four carbon atoms namely, propionaldehyde, n-butyraldehyde and iso-butyraldehyde may be used, while it is also possible to use unsaturated aldehydes such as methacrolein. Even when using one of these higher aldehydes a diluent may still be employed.

The amount of aldehyde employed relative to hydrocarbon depends on the nature of the hydrocarbon to be oxidised, the temperature and on the conversion of hydrocarbon required. In general, the molar ratio of hydrocarbon to aldehyde may be varied over a wide range, but the ratios within the range of 1:4 to 20:1 are preferable. More preferably, this ratio lies within the range of 1:1 to 8:1.

If a diluent is employed in the present process, this should dissolve or be miscible with the reactants. Acetone is a particularly suitable diluent, but, if desired, higher ketones may be used. It is also possible to use esters, for example, methyl acetate and ethyl acetate, and carboxylic acids, for example, acetic acid. It is also possible to use two or more of these diluents in admixture, a mixture of acetone and acetic acid being particularly suitable. In general, it is preferable to use diluents which contain $CH_3$ groups rather than CH or $CH_2$ groups.

It is desirable to carry out the present process using soluble salts of one or more metals of variable valency as initiators. In general, cobalt salts, for example, cobalt stearate and cobalt bromide, are the most suitable. Other good initiators are salts of ruthenium, manganese, nickel, chromium, vanadium, titanium, cerium, rhodium and osmium. These metals are in general preferably present as bromides or chlorides or salts of organic acids such as stearates and naphthenates. Mixtures of salts of metals may be used with advantage; for instance, mixtures of a cobalt salt, for example cobalt stearate, with a salt of one of the metals ruthenium, vanadium, manganese or chromium have been found to be particularly active. The different metals tend to lead to different product distributions. For example, in the co-oxidation of cyclohexane, salts of cobalt (particularly as stearate), chromium and vanadium, tend to favour the production of large total amounts of cyclohexanone plus cyclohexanol compared to the amount of adipic acid, whereas salts of ruthenium, nickel and manganese have the opposite effect.

The quantity of metal salt or salts employed will depend upon the compounds undergoing co-oxidation, the conditions employed in this and the products required. When, for instance, a cobalt salt is being employed in the co-oxidation of cyclohexane and acetaldehyde, a high pass yield of known products can be obtained with a cobalt concentration, based on the weight of cyclohexane, of 150 parts per million. In general, the metal concentration should be in the range of 10 to 10,000 parts per million based on the weight of hydrocarbon undergoing oxidation.

The initiator used in a particular process will depend upon the products required. For example, if it is intended to co-oxidise cyclohexane to a mixture of cyclohexanone and cyclohexanol as a step in a process for the production of phenol, it is desirable to use a mixture of salts of cobalt and chromium as the initiator. On the other hand, if the co-oxidation of cyclohexane is being carried out to produce adipic acid as the sole product, i.e. if it is wished to minimise formation of cyclohexanone and cyclohexanol, the process is preferably effected in the presence of a salt of ruthenium or mixed salts of cobalt and ruthenium.

The present process may also be carried out using an initiator other than the salt of a metal of variable valency. These initiators, which are however less effective, include ultra-violet light; hydrogen peroxide; ozone; alkyl hydroperoxides and dialkyl peroxides having formulae R—O—O—H and R—O—O—R respectively, where R is an alkyl group such as tertiary-butyl; diacyl peroxides such as di-acetyl peroxide or cyclohexylsulphonyl acetyl peroxide; alkyloxy diacyl peroxides such as di-isopropyl peroxy di-carbonate and peroxy esters such as tertiary-butyl perbenzoate.

As already stated, the co-oxidation process is carried out at a temperature of 30° to 200° C. In particular, it is preferable to employ a temperature in the range of 90° to 150° C. The reaction may be carried out at atmospheric pressure or at any suitable elevated pressure which is at least high enough to maintain the reaction mixture in the liquid phase, to maintain a sufficiently high concentration of dissolved oxygen for the reaction to proceed at a convenient speed and also to minimise losses by entrainment. The use of diluted oxygen in the process renders the use of elevated pressures more desirable. In particular, elevated pressures of up to 50 atmospheres are preferable.

The gas containing molecular oxygen may be oxygen itself, air, mixtures of nitrogen and oxygen, and oxygen together with any suitable diluent such as carbon dioxide or the hydrocarbon which is to be oxidised. It will be understood that if possible operation is effected outside the explosive limits. The oxygen rate is influenced by numerous factors. For instance, it is desirable to operate at a high space-time yield and with the desired product distribution, but at the same time it is necessary to limit the entrainment of organic compounds in the effluent gas and, for safe operation, to have an exit gas stream containing at most 10% oxygen by volume. In a preferred method of working the off-gas together with make-up oxygen or air is recycled to the reaction zone so that the oxygen content of the off-gas is kept at just below the 10% level. In general an oxygen: aldehyde molar ratio in the range 1:1 to 20:1 is desirable, ratios in the range of 3:1 to 10:1 being particularly suitable.

The present process may be carried out in a batchwise manner, that is the whole of the aldehyde and hydrocarbon or substituted hydrocarbon reactants are fed to the reaction vessel and the gas containing molecular oxygen is then passed through. Alternatively, the reaction may be carried out semi-continuously, that is by having all the hydrocarbon or substituted hydrocarbon initially in the reaction vessel, aldehyde being fed in continuously as the reaction proceeds. Again, continuous operation is possible. In one such method, the starting materials are passed co-currently or counter-currently through a reactor tube. In another continuous method the hydrocarbon or substituted hydrocarbon is fed into the end of the reactor tube and the aldehyde is injected into this at a succession of porcelain, enamel and resins.

In the process of the invention, a variety of materials may be used for constructing the reactor and subsidiary equipment, for example, aluminum, the metal sold under the registered trademark "Staybrite," titanium, tin, glass, porcelain, enamel and resins.

The process of the present invention enables a compound which can only be oxidised with difficulty, for example a hydrocarbon, to be oxidised smoothly without an induction period at lower temperatures than in conventional air oxidation processes. The reaction has greater selectivity. Thus, by the co-oxidation of cyclohexane, higher total yields of cyclohexanone, cyclohexanol and adipic acid can be obtained than by conventional methods, while the process may be operated at higher conversion levels. Furthermore, in conventional air oxidation processes, adipic acid is only obtained directly, together with cyclohexanone and cyclohexanol at a great sacrifice in product yield. By varying the manner in which the present co-oxidation is carried out the proportions of adipic acid, cyclohexanone and cyclohexanol can be varied in a controlled manner. If desired, adipic acid can be produced as the sole desired product by recycling cyclohexanone and cyclohexanol to the reaction zone. Alternatively, increased quantities of adipic acid may be formed by further oxidising the co-oxidation product with nitric acid.

Cyclohexanol and cyclohexanone obtained by the present process may be used, for example, in the production of phenol, caprolactam or adipic acid. Adipic acid, produced directly by the present process or by a subsequent treatment of compounds obtained thereby, may be used for the production of polymers.

*Example 1* n-Butyraldehyde (18.0 grams; 0.25 mole) was added gradually over a period of 135 minutes to a mixture of n-octane (58.7 grams; 0.515 mole) and cobalt stearate (0.2 gram) contained in a glass reaction vessel having a capacity of 500 ml., maintained at 74–78° C. and at atmospheric pressure. Molecular oxygen was passed through at a rate of 15 litres per hour by means of a cruciform stirrer, the passage of gas being maintained for a further fifteen minutes after the addition of the aldehyde had been completed. The crude reaction product, which contained 0.197 equivalent of acid as measured by titration (79% yield, on aldehyde charged), was washed with an excess of an aqueous dilute sodium hydroxide solution, this solution and the residue were extracted with ether and the ether extract was distilled under vacuum to give unchanged n-octane (54.1 grams; 92.2% recovery) and heavy end material (5.0 grams). Unchanged n-butyraldehyde was not detected in the crude reaction product. The heavy-end material was a seven-component mixture composed of octanones-2, -3 and -4 (about 25% by weight of each) octanols-2, -3 and -4 (about 5% by weight of each) and a heavier ketone fraction, possibly comprising one or more diketones (about 10% by weight). On working up the alkaline aqueous extract it was found that n-butyric acid was by far the major acidic product (90 equivalent percent of total acidic products), and that the remaining material was propionic acid, acetic acid and acids containing more than four carbon atoms in the equivalent ratio of 4:1:5. Thus, the conversions of n-butyraldehyde and n-octane were 100% and 7.8% respectively, and the yields of octanones and octanols, based on n-octane reacted, were 72.5% and 14.5% respectively.

Confirmatory evidence for the formation of octanones and octanols was obtained by reducing a portion (0.8 gram) of the heavy-end material with lithium aluminum hydride (0.2 gram) in dry ether at 35° C. for one hour. Acidification of the product followed by ether extraction and distillation gave an ether-free product (0.7 gram) composed of almost equal amounts of octanols-2, -3 and -4 together with a much smaller amount of a heavier alcoholic component, which had presumably been derived from the heavy di-ketone by-product; ketones were not detected in the crude product. This indicates that the products of the process of the present invention may be readily converted by reduction or hydrogenation into secondary alcohols which have useful commercial applications.

The oxidation reaction was repeated substantially as described above except that no aldehyde was employed. The crude product contained less than 0.001 equivalent of acid and was essentially unchanged n-octane. No ketonic or alcoholic products were detected. This experiment indicates the necessity of incorporating an aldehyde in the hydrocarbon to be oxidised.

*Example 2* n-Butyraldehyde (18.3 grams; 0.254 mole) was continuously added over a period of 130 minutes to a mixture of cyclohexane (42.5 grams; 0.506 mole) and cobalt stearate (0.2 gram) contained in the apparatus described in Example 1. The reaction mixture was maintained at a temperature of 76° C. and as before reaction was carried out at atmospheric pressure. Gaseous oxygen was passed through the reaction mixture as before, the flow of gas being maintained for a further 110 minutes after the aldehyde addition was complete. The resulting two-phase reaction product was filtered to give a solid phase (1.09 gram), which was shown by infra-red spectroscopy and its acid value to be virtually pure adipic acid, and a liquid filtrate (62.9 grams), which contained 0.244 equivalent of acid, unchanged cyclohexane, unchanged n-butyraldehyde, cyclohexanol and cyclohexanone (54.0, 1.8, 2.2 and 8.5% by weight respectively).

The liquid filtrate was extracted with an excess of dilute aqueous sodium bicarbonate solution. This solution was washed with ether and the free acids were then liberated by acidification. In this way, n-butyric acid 0.209 equivalent) and adipic acid (0.035 equivalent) were obtained. No other acidic products were detected in either the sodium bicarbonate solution extract or in the residue from this.

Summarising these results, it will be seen that the crude reaction product (64.0 grams) contained unchanged cyclohexane (33.95 grams), unchanged n-butyraldehyde (1.1 gram), cyclohexanol (1.4 gram), cyclohexanone (5.35 grams), adipic acid (3.65 grams) and n-butyric acid (18.4 grams). Only 0.15 gram of the crude reaction product remained unidentified. It will be seen from these figures that 20.1% of the cyclohexane and 94% of the n-butyraldehyde underwent conversion. The yields of cyclohexanol, cyclohexanone and adipic acid per mole of n-butyraldehyde converted were 0.06, 0.23 and 0.11 mole respectively making a total of 0.40 mole of adipic acid or compounds readily oxidisable to adipic acid per mole of n-butyraldehyde consumed. The molar ratio cyclohexanone:adipic acid:cyclohexanol calculated from these figures is 3.8:1.8:1. The molar yields of cyclohexanol, cyclohexanone and adipic acid per mole of cyclohexane consumed were 13.7%, 53.5% and 25.8%, so that 93% of the reacted cyclohexane was converted to adipic acid or compounds readily oxidisable to adipic acid. The molar yield of n-butyric acid on the quantity of n-butyraldehyde consumed was 88%.

The process was repeated except that in the second case the operating temperature was 55–57° C. and in the third case it was 35° C. The results already given and those obtained in these two further experiments are summarised in Table 1 below.

TABLE 1

| Temp., °C. | Conversion of cyclohexane (percent) | Conversion of n-butyraldehyde (percent) | Moles K+A+AA per mole n-butyraldehyde converted | Molar ratio K:AA:A | Moles K+A+AA per mole cyclohexane consumed | Molar yield n-butyric acid on n-butyraldehyde consumed(percent) |
| --- | --- | --- | --- | --- | --- | --- |
| 35 | 6.6 | 100 | 0.13 | 1.6:1.1:1 | 0.96 | 79 |
| 55–57 | 18.2 | 100 | 0.33 | 3.3:1.2:1 | 0.91 | 80 |
| 76 | 20.1 | 94 | 0.40 | 3.8:1.8:1 | 0.93 | 88 |

NOTE.—In this table, K=cyclohexanone, AA=adipic acid and A=cyclohexanol.

These results show that with increasing temperature greater overall yields of adipic acid and precursors thereof are obtained. Indeed, the optimum yield at atmospheric pressure can probably be obtained at a temperature above 76° C. Also, in the initial experiment described in this example, some adipic acid of high purity was obtained by simply filtering the crude reaction product. If the process aims at the production of adipic acid as the major product, the intermediate oxidation compounds could be recycled to the oxidation system.

The first experiment described in this example was repeated in the absence of added aldehyde. The product was essentially unchanged cyclohexane, only minute amounts of cyclohexanone and cyclohexanol being detected.

Example 3

A solution of acetaldehyde (11.0 grams; 0.25 mole) in acetone (22.9 grams) was added over 135 minutes to a mixture of cyclohexane (42.6 grams; 0.507 mole), acetone (38.2 grams) and cobalt stearate (0.2 gram) contained in the apparatus described in Example 1. Oxygen was passed through as described therein, the temperature of the mixture was maintained at 56° C. and the pressure was atmospheric. After all of the acetaldehyde had been added, the flow of oxygen was continued for a further 105 minutes. At the end of this time, the product was removed and allowed to cool. It was a single-phase mixture which contained 0.161 equivalent of acid. Distillation showed that the principal products were cyclohexanol, cyclohexanone and adipic acid, these being formed in an 86% molar yield based on cyclohexane consumed. The conversion of cyclohexane was 11%. The acetic acid yield, based on the amount of acetaldehyde reacted was 81%, the acetaldehyde conversion being 72%.

In a second experiment, carried out as above except that acetone was absent and the temperature was 75° C., only 0.055 equivalent of acid was produced, much of the acetaldehyde remaining unchanged. Also, the amounts of cyclohexanol, cyclohexanone and adipic acid were lower than when using acetone as a diluent. This result may probably be attributed to the separation in this experiment of an aqueous phase in which most of the cobalt salt accumulated. When acetaldehyde is used as the co-oxidant, this does not occur if an inert homogenising diluent such as acetone is employed.

Example 4

A solution of n-butyraldehyde (7.3 grams; 0.10 mole) in cyclohexane (27.3 grams) was gradually added during 315 minutes to cyclohexane (43.0 grams) contained in the apparatus described in Example 1 and maintained at a temperature of 72–74° C., the pressure being atmospheric. Oxygen was passed through at a rate of 15 litres per hour, the oxygen having previously passed through an ozoniser to give it a content of 0.02 gram of ozone per litre. The passage of the gas was continued for 5 minutes after aldehyde addition was complete. The resulting two-phase reaction product was filtered to give a solid phase (1.8 grams) which was essentially adipic acid, and a liquid filtrate (75.1 grams) containing 0.077 equivalent of acid. This filtrate contained cyclohexanone (1.65 grams), cyclohexanol (0.7 gram), adipic acid (1.1 gram; 0.015 equivalent) n-butyric acid (5.45 grams; 0.062 equivalent) and unchanged cyclohexane (66.0 grams). Unchanged n-butyraldehyde was not detected. From the above results, the conversions of cyclohexane and n-butyraldehydew ere calculated to be 6.1% and 100% respectively, and the n-butyric acid yield was 61%. The molar ratio adipic acid:cyclohexanone:cyclohexanol was 2.8:2.4:1 while 0.44 mole of adipic acid and its precursors (cyclohexanone and cyclohexanol) was produced per mole of n-butyraldehyde employed. The molar yield of adipic acid and its precursors based on the amount of cyclohexane reacted was 86%.

This experiment was repeated without using n-butyraldehyde, conditions otherwise being the same except that 84.4 grams (1.004 mole) cyclohexane were used. The two phase reaction product was made up of a solid phase (0.17 gram) which was essentially pure adipic acid, and a liquid phase (82.6 grams) which contained cyclohexane (80.7 grams) cyclohexanone (0.9 gram), cyclohexanol (0.7 gram) and adipic acid (0.23 gram).

In the previous experiment 0.044 mole of adipic acid and its precursors was formed. In this experiment using 84.4 grams of cyclohexane as against 70.4 grams, only 0.018 mole of adipic acid and its precursors was formed. Furthermore, the molar yield of adipic acid and its precursors based on the amounts of cyclohexane reacted was only 40%.

*Example 5*

A solution of n-butyraldehyde (7.3 grams; 0.10 mole) in methylcyclohexane (27.3 grams; 0.279 mole) was injected continuously during 5 hours into a glass reaction vessel containing methylcyclohexane (47.4 grams; 0.483 mole). Conditions, including the use of ozonised oxygen were as given in Example 4. The crude product consisted of a two-phase liquid, an upper organic phase (76.4 grams) and a lower aqueous phase (4.4 grams), a total of 0.107 equivalent of acid being present. On working up the product, it was found that n-butyric acid, acetic acid, formic acid and higher acids (i.e. containing more than 4 carbon atoms) were present, the amounts being 0.0703, 0.0046, 0.0041 and 0.0280 equivalent respectively. The neutral products (12.1 grams), consisted of some 40% by weight of 1-methylcyclohexanol, 30% by weight of mixed 2-, 3-, and 4-methylcyclohexanones and some 20% by weight of mixed methylcyclohexanols (namely, cis- and trans-isomers of 3- and 4-methylcyclohexanol). Of the total quantity of 74.7 grams of methylcyclohexane fed, 59 grams were recovered unchanged, the conversion, therefore, being 21%. Of the methylcyclohexane converted, some 60% went to methylcyclohexanones and methylcyclohexanols.

*Example 6*

A solution of cobalt naphthenate (4.0 grams containing 10% by weight cobalt) in cyclohexane (1344 grams; 16.0 moles) was charged to a 3-litre, aluminium-lined pressure vessel and heated to 95° C. under a pressure of 400 lbs. per square inch. Acetaldehyde (176 grams; 4.0 moles) and an oxygen-nitrogen mixture (10% by volume of oxygen, total gas rate 1135 litres per hour) were injected into the solution continuously for 130 minutes. The analysis of the reaction product was as follows:

| | Grams |
|---|---|
| Cyclohexane | 1181 |
| Acetaldehyde | 24.6 |
| Cyclohexanol | 42.7 |
| Cyclohexanone | 84.7 |
| Cyclohexyl acetate | <2.0 |
| Adipic acid | 33.0 |
| Glutaric acid | 5.7 |
| Succinic acid | 2.8 |
| Formic acid | 2.4 |
| Acetic acid | 126.0 |
| Carbon dioxide | 28.6 |
| Carbon monoxide | 10.2 |
| Water | 40.3 |

Further experiments were carried out as above, but using reaction temperatures of 115° and 135° C. The results obtained are given in Table 2 below.

TABLE 2

| Temp., °C. | Acetaldehyde conversion (percent) | Cyclohexane conversion (percent) | Pass yield of known products (percent) | Molar ratio, known products: acetaldehyde consumed | Molar yield, known products (percent on cyclohexane consumed) |
|---|---|---|---|---|---|
| 95 | 86.0 | 12.1 | 9.9 | 0.46 | 81.6 |
| 115 | 88.5 | 21.1 | 16.3 | 0.74 | 77.1 |
| 135 | 86.8 | 28.8 | 20.8 | 0.96 | 72.1 |

In Table 2 and all succeeding tables, the term "known products" refers to known cyclohexane oxidation products and comprises cyclohexanone, cyclohexanol, cyclohexyl acetate, adipic acid, glutaric acid and succinic acid.

These results show that an increase in reaction temperature leads to increases in cyclohexane conversion, pass yield of known products and the extent of oxidative attack on cyclohexane per unit of acetaldehyde consumed. On the other hand, the yield of known products, based on the amount of cyclohexane consumed, decreases with increasing temperature.

*Example 7*

The process of Example 6 was repeated at a temperature of 115° C. except that three different quantities of acetaldehyde were employed so that the cyclohexane: acetaldehyde molar ratio was varied. The results are given in Table 3 below.

TABLE 3

| Cyclohexane: acetaldehyde, molar ratio | Acetaldehyde conversion (percent) | Cyclohexane conversion (percent) | Pass yield of known products (percent) | Molar ratio, known products: acetaldehyde consumed | Molar yield, known products (percent on cyclohexane consumed) |
|---|---|---|---|---|---|
| 8:1 | 84.2 | 17.5 | 10.2 | 0.97 | 58.3 |
| 4:1 | 88.5 | 21.1 | 16.3 | 0.74 | 77.1 |
| 2:1 | 89.6 | 31.6 | 20.8 | 0.47 | 66.0 |

A decrease in the cyclohexane:acetaldehyde ratio thus leads to an increase in cyclohexane conversion, an increase in the pass yield of known cyclohexane oxidation products and a decrease in the extent of oxidative attack on cyclohexane per unit quantity of acetaldehyde reacted.

Although detailed analytical results are not presented above, a decrease in the cyclohexane:acetaldehyde molar ratio leads to a different product distribution. The quantity of adipic acid relative to the total amount of cyclohexanol and cyclohexanone is increased as is the amount of cyclohexanone relative to cyclohexanol.

Example 8

Example 6 was repeated at a temperature of 135° C. and a pressure of 400 lbs. per square inch, the reaction time being 130 minutes. In the first run an oxygen-nitrogen mixture containing 10% by volume of oxygen was passed through the reaction mixture at a rate of 1135 litres per hour. In the second run, air was passed through the reaction mixture at a rate of 1290 litres per hour. The results of these two runs are summarised in Table 4.

each case the temperature was 115° C., the pressure 400 lbs. per square inch, the reaction time 225 minutes, the oxidising gas rate 1135 litres per hour of an oxygen-nitrogen gas mixture containing 10% by volume of oxygen, and the catalyst 4.0 grams of cobalt naphthenate. The make-up of the two reaction mixtures was as follows:

|  | A | B |
|---|---|---|
| Cyclohexane | 1344 grams (16 moles) | 672 grams (8 moles). |
| Diluent | Nil | 672 grams acetone. |
| Acetaldehyde | 352 grams (8 moles) | 176 grams (4 moles). |

The results obtained are given in Table 6 below.

TABLE 6

| Mixture | Acetaldehyde conversion, percent | Cyclohexane conversion, percent | Pass yield known products, percent | Molar ratio known products : acetaldehyde consumed | Molar yield known products (percent on cyclohexane consumed) | Molar yield acetic acid (percent on acetaldehyde consumed) |
|---|---|---|---|---|---|---|
| A | 87 | 40.5 | 19.3 | 0.44 | 47.6 | 76 |
| B | 81 | 58.1 | 30.9 | 0.76 | 53.2 | 91 |

TABLE 4

| Oxygen: acetaldehyde, molar ratio | Acetaldehyde conversion (percent) | Pass yield of known products (percent) | Molar ratio, known products: acetaldehyde consumed | Molar ratio, (K+A):AA | Molar ratio, K:A |
|---|---|---|---|---|---|
| 2.6 | 86.8 | 20.8 | 0.96 | 5.5 | 2.2 |
| 6.1 | 85.1 | 26.6 | 1.25 | 3.4 | 3.8 |

K=cyclohexanone. A=cyclohexanol. AA=adipic acid.

An increase in oxygen availability thus leads to an increase in the pass yield of known products and to an increase in the molar ratio of known products per mole of acetaldehyde consumed and also gives rise to a changed product distribution.

Example 9

Solutions of cyclohexane (672 grams; 8.0 moles), acetone (672 grams), acetaldehyde (88.0 grams; 2.0 moles) and cobalt naphthenate (0.125 gram to 8.0 grams) were co-oxidised at 115° C. at a pressure of 400 lbs. per square inch for 2 hours as described in Example 6. A blank experiment was carried out in the absence of cobalt for comparative purposes. The results obtained are given in Table 5.

The use of acetone as solvent gives rise to improved results. It also leads to an altered distribution of reaction products. For instance, the molar ratio (cyclohexanone+cyclohexanol):adipic acid was halved by the use of acetone as solvent.

Example 11

This example illustrates the production of dibasic acids from a reaction mixture comprising cyclohexanone and cyclohexanol (which may already have been produced by the partial oxidation of cyclohexane) and cyclohexane, some of which have been recycled from a previous co-oxidation and some of which may have been introduced as feed make-up.

Example 6 was carried out using a mixture of cyclo-

TABLE 5

| Co conc. (p.p.m. on wt. of cyclohexane + acetone) | Acetaldehyde conversion (percent) | Cyclohexane conversion (percent) | Pass yield of known products (percent) | Molar ratio, known products: acetaldehyde consumed | Molar yield, known products (percent on cyclohexane) | Molar yield, acetic acid (percent on acetaldehyde) |
|---|---|---|---|---|---|---|
| Nil | 81 | 46.7 | 19.4 | 0.96 | 41.5 | 79 |
| 9 | 87 | 39.8 | 24.5 | 1.13 | 61.4 | 81 |
| 150 | 80 | 41.0 | 27.0 | 1.35 | 65.8 | 90 |
| 596 | 81 | 41.5 | 24.6 | 1.21 | 59.2 | 74 |

Under the particular conditions employed in this example it appears that a concentration of 150 parts per million by weight of cobalt gives the best results. Product distribution also depends on cobalt concentration. For example, with increasing cobalt concentration, the quantity of adipic acid isolated from the product increased compared to the total quantities of cyclohexanone and cyclohexanol formed.

Example 10

Example 6 was repeated using two different reaction mixtures, one of which contained actone as solvent. In hexane (5.20 moles), cyclohexanone (2.56 moles) and cyclohexanol (0.24 mole) together with acetone (672 grams) and cobalt naphthenate (4.0 grams). The reaction was carried out at a temperature of 115° C. and a pressure of 400 lbs. per square inch using acetaldehyde (88 grams; 2.0 moles) and an oxygen-nitrogen gas mixture (15% by volume of oxygen; 1200 litres per hour) which were injected into the solution during the course of 2 hours. The crude reaction product contained amounts of cyclohexanol and cyclohexanone which were essentially the same as those charged, i.e. the net make of these compounds was virtually zero. The detailed analysis of the results was as follows:

|  | Percent |
|---|---|
| Acetaldehyde conversion | 75 |
| Cyclohexane conversion | 48 |
| Molar yields on cyclohexane consumed: | |
| Adipic acid | 42 |
| Glutaric acid | 10 |
| Succinic acid | 8 |
| Molar yield acetic acid on acetaldehyde consumed | 91 |
| Molar ratio dibasic acids/acetaldehyde consumed | 1.00 |

Example 12

Cyclohexane (4032 grams; 48.0 moles), acetone (4032 grams) and cobalt naphthenate (24.0 grams, containing 10% by weight of cobalt) were co-oxidised with acetaldehyde (1056 grams; 24.0 moles) in a 26-litre stirred titanium reactor at a temperature of 116–118° C. and at a pressure of 400 lbs. per square inch over 220 minutes, using an oxygen-nitrogen mixture containing 8.8% by volume of oxygen passed through at a rate of 6.6 cu. metres per hour. An analysis of the products obtained was as follows:

|  | Grams |
|---|---|
| Cyclohexane | 1557 |
| Acetaldehyde | 9 |
| Cyclohexanol | 74 |
| Cyclohexanone | 408 |
| Adipic acid | 1198 |
| Glutaric acid | 286 |
| Succinic acid | 150 |
| Acetic acid | 966 |
| Formic acid | 95 |
| Water | 991 |

Example 13

Cyclohexane (48.0 moles) was co-oxidised as in Example 12 except that only 868 grams acetaldehyde (19.73 moles) were employed and the total reaction time was 185 minutes. The product was fractionally distilled to remove acetone, cyclohexane, water, formic acid and acetic acid. The residue, which weighed 4141 grams, contained 1816 grams of adipic acid, 312 grams glutaric acid, 288 grams succinic acid, 404 grams cyclohexanone, 55 grams cyclohexanol, 18 grams cyclohexyl acetate and 1248 grams of other materials. On oxidising this mixture with dilute nitric acid, 2485 grams adipic acid, 567 grams glutaric acid and 642 grams succinic acid were obtained. A proportion of the adipic acid (some 670 grams) arose from the oxidation of cyclohexanone, cyclohexanol and cyclohexyl acetate, whilst substantial proportions of the glutaric and succinic acids must have been obtained by the oxidation of the unidentified by-products. The amount of adipic acid produced corresponded to an over-all molar yield of 56.3% based on the weight of cyclohexane consumed in the co-oxidation step.

Example 14 n-Butyraldehyde (1.0 mole) was added gradually at a constant rate over 3 hours to a mixture of cyclohexane (1.0 mole) and a salt of the metal to be tested (present in a concentration to give 100 parts per million of metal on cyclohexane charged) maintained at 70–75° C. at atmospheric pressure. Dry oxygen (24.0 litres per hour) was passed through simultaneously using a high speed cruciform stirrer. Where binary mixtures of salts were tested, each metal was present at a concentration of 50 parts per million on cyclohexane charged. Results obtained in Table 7 below were obtained.

TABLE 7

| Catalyst | Cyclohexane conversion | Molar ratio, known products:n-butyraldehyde consumed | Molar yield, K+A+AA (percent on cyclohexane consumed) | Molar ratio, (K+A):AA | Molar ratio, K:A |
|---|---|---|---|---|---|
| None | 2.2 | 0.019 | 81.8 | 5.9 | 0.8 |
| Co stearate | 33.8 | 0.23 | 61.8 | 5.1 | 4.8 |
| CoBr$_2$.6H$_2$O | 34.0 | 0.24 | 63.2 | 4.2 | 3.8 |
| Ru stearate | 16.7 | 0.16 | 77.7 | 2.5 | 5.6 |
| Mn naphthenate | 26.6 | 0.17 | 56.0 | 3.9 | 1.8 |
| Ni stearate | 19.8 | 0.16 | 71.8 | 3.6 | 2.5 |
| Cr stearate | 15.0 | 0.16 | 93.6 | 6.9 | 2.6 |
| V naphthenate | 16.0 | 0.13 | 73.5 | 6.8 | 18.6 |
| TiCl$_4$ | 27.6 | 0.090 | 31.1 | 7.9 | 1.6 |
| Ti stearate | 10.1 | 0.096 | 86.5 | 6.9 | 1.7 |
| CeO$_2$ | 15.1 | 0.081 | 49.3 | 17.8 | 3.7 |
| Rh stearate | 11.5 | 0.080 | 67.6 | 5.3 | 1.1 |
| Os stearate | 11.9 | 0.080 | 51.0 | 44.0 | 0.6 |
| Co stearate plus Ru stearate | 37.0 | 0.21 | 51.6 | 2.6 | 6.8 |
| Co stearate plus V naphthenate | 28.3 | 0.21 | 65.2 | 6.3 | 4.8 |
| Co stearate plus Mn naphthenate | 20.0 | 0.15 | 66.8 | 7.0 | 3.3 |
| Co stearate plus Cr stearate | 26.7 | 0.14 | 45.0 | 16.6 | 3.3 |

K = cyclohexanone  A = cyclohexanol  AA = adipic acid.

In all cases in this example, the n-butyraldehyde conversion was between 90.8 and 96.5% while the molar yield of n-butyric acid on butyraldehyde consumed was between 73.1 and 91.9%.

Example 15

Cyclohexane (1.0 mole) and alpha-methyl acrolein (0.48 mole) were co-oxidised by molecular oxygen (24 litres per hour) for 3 hours at atmospheric pressure and at a temperature of 70–75° C. in the presence of cobalt stearate, equivalent to 477 parts per million cobalt on cyclohexane. The crude reaction product contained 0.85 mole unchanged cyclohexane, 0.22 mole alpha-methyl acrolein, 0.5 gram cyclohexanol, 0.6 gram cyclohexanone and 0.125 equivalent total acids, of which 0.106 equivalent was lower aliphatic acids originating from the aldehyde. Further analysis of the mixed acids revealed the presence of 2.3 grams alpha-methyl acrylic acid and 0.5 gram of adipic acid.

Example 16 n-Butyraldehyde (0.50 mole) was added over a period of 90 minutes at a constant rate to methyl cyclohexane (1.0 mole) containing 407 parts per million of cobalt (as cobalt stearate) based on the weight thereof. The reaction mixture was maintained at a temperature of 82–90° C. and at atmospheric pressure. Molecular oxygen was passed through at a rate of 24 litres per hour via a high-speed cruciform stirrer. On working up the crude reaction product, it was found that 98.0% of the n-butyraldehyde and 19.0% of the methyl cyclohexane had undergone conversion. Of the methyl cyclohexane which had reacted, 67.3% had undergone conversion to known products, the molar yields of alcohols and ketones being as follows: 1-methylcyclohexanol 23.3%;

2-, 3- and 4-methylcyclohexanols 23.9%; 2-, 3- and 4-methylcyclohexanones 19.5%.

What is claimed is:

1. A process for the production of oxygen-containing organic compounds, selected from the group consisting of carboxylic acids, alcohols and ketones, which comprises co-oxidizing in a liquid mixture an aldehyde having from two to four carbon atoms and a cycloparaffin selected from the group consisting of cyclopentane and cyclohexane and methyl derivatives thereof, the molar ratio of the said cycloparaffin to the said aldehyde being in the range of 1:1 to 8:1, at a temperature in the range of 90 to 150° C., and at a pressure of atmospheric to 50 atmospheres with a gas containing molecular oxygen, the molar ratio of the oxygen in said gas to said aldehyde being in the range of 3:1 to 10:1, in the presence of a cobalt salt soluble in the reaction mixture, the cobalt concentration lying in the range of 10 to 10,000 p.p.m. based on the weight of the cycloparaffin undergoing oxidation.

2. A process as claimed in claim 1 in which the aldehyde is methacrolein.

3. A process as claimed in claim 1 in which the aldehyde is iso-butyraldehyde.

4. A process as claimed in claim 1 in which the aldehyde is n-butyraldehyde.

5. A process as claimed in claim 1 in which the aldehyde is acetaldehyde.

6. A process as claimed in claim 1 in which the aldehyde is propionaldehyde.

7. A process as claimed in claim 1 in which the reaction is carried out in the presence of a solvent selected from the group of oxygen-containing organic compounds comprising acetone, methyl acetate, ethyl acetate and acetic acid.

8. A process as claimed in claim 1 in which the reaction is carried out in the presence of ozone.

9. A process as claimed in claim 1 in which the oxygen content of the gas employed is such that the exit gas stream from the oxidation process contains at most 10% oxygen by volume.

References Cited

UNITED STATES PATENTS

| | | | |
|---|---|---|---|
| 2,223,494 | 12/1940 | Loder | 260—586 |
| 2,285,914 | 6/1942 | Drossbach | 260—537 XR |
| 2,316,543 | 4/1943 | Amend | 260—537 |
| 2,341,288 | 2/1944 | Pruckner | 260—537 XR |
| 2,588,388 | 3/1952 | Hull | 260—586 XR |
| 2,828,338 | 3/1958 | Lavigne | 260—537 XR |
| 2,920,087 | 1/1960 | Hay | 260—586 XR |
| 3,251,878 | 5/1966 | Pasky | 260—537 |
| 2,577,829 | 12/1951 | Visor | 260—530 |
| 2,945,058 | 7/1960 | Watson et al. | 260—530 |
| 2,959,613 | 11/1960 | Whitfield | 260—530 |

FOREIGN PATENTS 824,116  11/1959  Great Britain.

LORRAINE A. WEINBERGER, *Primary Examiner.*

I. R. PELLMAN, R. K. JACKSON, V. GARNER,
*Assistant Examiners.*